United States Patent
Idicula et al.

(10) Patent No.: US 7,395,271 B2
(45) Date of Patent: Jul. 1, 2008

(54) MECHANISM TO ENABLE EVOLVING XML SCHEMA

(75) Inventors: Sam Idicula, Foster City, CA (US); Nipun Agarwal, Santa Clara, CA (US); Ravi Murthy, Fremont, CA (US); Eric Sedlar, San Francisco, CA (US); Sivasankaran Chandrasekar, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 569 days.

(21) Appl. No.: 10/648,497

(22) Filed: Aug. 25, 2003

(65) Prior Publication Data

US 2005/0050056 A1 Mar. 3, 2005

(51) Int. Cl.
*G06F 17/30* (2006.01)

(52) U.S. Cl. ............................ 707/102; 707/2; 707/100; 707/103 R; 709/203

(58) Field of Classification Search ............ 707/3, 707/204, 1, 4, 100, 102, 103, 104, 200, 103 R, 707/2; 709/203
See application file for complete search history.

(56) References Cited

U.S. PATENT DOCUMENTS

| | | | |
|---|---|---|---|
| 6,604,100 B1 | 8/2003 | Fernandez et al. | |
| 6,636,845 B2 | 10/2003 | Chau et al. | |
| 6,772,180 B1 * | 8/2004 | Li et al. | 715/513 |
| 6,820,135 B1 * | 11/2004 | Dingman et al. | 709/246 |
| 6,845,380 B2 * | 1/2005 | Su et al. | 707/102 |
| 6,847,974 B2 * | 1/2005 | Wachtel | 707/101 |
| 6,941,511 B1 * | 9/2005 | Hind et al. | 715/523 |
| 7,031,956 B1 * | 4/2006 | Lee et al. | 707/3 |
| 7,036,072 B1 * | 4/2006 | Sulistio et al. | 715/517 |
| 7,043,487 B2 * | 5/2006 | Krishnamurthy et al. | 707/100 |
| 7,089,491 B2 * | 8/2006 | Feinberg et al. | 715/522 |
| 7,146,399 B2 * | 12/2006 | Fox et al. | 709/203 |
| 7,225,411 B1 * | 5/2007 | Stoner et al. | 715/760 |
| 2002/0073019 A1 | 6/2002 | Deaton | |
| 2002/0116457 A1 | 8/2002 | Eshleman et al. | |
| 2002/0184401 A1 | 12/2002 | Kadel, Jr. et al. | |
| 2003/0120665 A1 * | 6/2003 | Fox et al. | 707/100 |
| 2003/0140308 A1 | 7/2003 | Murthy et al. | |

(Continued)

OTHER PUBLICATIONS

Shelley Higgins, Oracle Corporation, "Oracle9*i*, XML Database Developer's Guide—Oracle XML DB," Release 2 (9.2), Oct. 2002, Part No. A96620-02, pp. 1-1,044 (text provided on CD-ROM).

(Continued)

*Primary Examiner*—Tim Vo
*Assistant Examiner*—Dangelino N Gortayo
(74) *Attorney, Agent, or Firm*—Hickman Palermo Truong & Becker LLP; Christian A. Nicholes

(57) ABSTRACT

A method and system for evolving XML-schema-based data to conform to an evolved XML schema is disclosed. Based on an existing XML schema and an instance document that is based on the existing XML schema, an XML-schema-independent form of the instance document is generated. Based on a set of specified transformations and the XML-schema-independent form of the instance document, an evolved instance document is generated. The evolved instance document conforms to an evolved XML schema that incorporates changes to the existing XML schema. Techniques described herein are flexible enough to accommodate a wide variety of evolutions to XML schemas.

4 Claims, 6 Drawing Sheets

U.S. PATENT DOCUMENTS

| | | | |
|---|---|---|---|
| 2004/0064466 A1 | 4/2004 | Manikutty et al. | |
| 2004/0064825 A1* | 4/2004 | Lim et al. | 719/319 |
| 2004/0083218 A1* | 4/2004 | Feng | 707/100 |
| 2004/0148278 A1 | 7/2004 | Milo et al. | |
| 2004/0216030 A1* | 10/2004 | Hellman et al. | 715/500 |
| 2004/0267760 A1 | 12/2004 | Brundage et al. | |
| 2005/0050058 A1 | 3/2005 | Jain et al. | |
| 2005/0050092 A1 | 3/2005 | Jain et al. | |
| 2005/0050105 A1 | 3/2005 | Idicula et al. | |
| 2005/0289125 A1 | 12/2005 | Liu et al. | |

OTHER PUBLICATIONS

Daniele Braga et al., "A Graphical Environment to Query XML Data with Query," Proceedings of the Fourth International Conference on Web Information Systems Engineering (WISE '03), 2003, IEEE, 10 pages.

Ipedo, Inc., "Ipedo XML Database 3.1: Developer's Guide," 2001, XP-002306148, 12 pages.

Chris Parkerson, "Ipedo XML Database 3.1 Now Available," Jul. 22, 2002, XP-002306149, pp. 1-2.

Can Türker, "Schema Evolution in SQL-99 and Commercial (Object-) Relational DBMS," 9th International Workshop on Foundations of Models and Languages for Data and Obejcts Fomlado/Demm 2000, Sep. 18, 2000, XP-002306150, pp. 1-32.

Hong Su et al., "XEM: XML Evolution Management," Jan. 2002, XP-002306151, pp. 1-32.

Yuan Wang et al., "X-Diff: An Effective Change Detection Algorithm for XML Documents," Proceedings of the 19th International Conference on Data Engineering (ICDE'03), 2003, IEEE, pp. 519-530.

Awais Rashid, "A Framework for Customisable Schema Evolution in Object-Oriented Databases," Proceedings of the Seventh International Database Engineering and Applications Symposium (IDEAS'03), 2003, IEEE, 5 pages.

Xue Li, "A Survey of Schema Evolution in Object-Oriented Databases," 1999, IEEE, pp. 362-371.

International Search Authority, "Notification of Transmittal of the International Search Report and the Written Opinion of the International Search Authority, or the Declaration," Dec. 8, 2004, Internatioanl Application No. PCT/US2004/027464, 14 pages.

"Current Claims of PCT/US2004/027464," pp. 1-7.

Oracle, "Conventional and Direct Path Loads," Chapter 9 of Oracle 9i Database Utilities-Release 2 (9.2), Copyright 2002 Ortacle Corporation, 29 pages.

* cited by examiner

MECHANISM TO ENABLE EVOLVING XML SCHEMA

RELATED APPLICATIONS

The present application is related to the following U.S. Patent Applications, the entire contents of which are incorporated herein by reference for all purposes:

U.S. patent application Ser. No. 10/260,138, filed on Sep. 27, 2002, entitled OPERATORS FOR ACCESSING HIERARCHICAL DATA IN A RELATIONAL SYSTEM, by Nipun Agarwal, Ravi Murthy, Eric Sedlar, Sivasankaran Chandrasekar and Fei Ge;

U.S. patent application Ser. No. 10/260,384, filed on Sep. 27, 2002, entitled PROVIDING A CONSISTENT HIERARCHICAL ABSTRACTION OF RELATIONAL DATA, by Nipun Agarwal, Eric Sedlar, Ravi Murthy and Namit Jain;

U.S. patent application Ser. No. 10/259,278, filed on Sep. 27, 2002, entitled MECHANISM FOR MAPPING XML SCHEMAS TO OBJECT-RELATIONAL DATABASE SYSTEMS, by Ravi Murthy, Muralidhar Krishnaprasad, Sivasankaran Chandrasekar, Eric Sedlar, Vishu Krishnamurthy and Nipun Agarwal;

U.S. patent application Ser. No. 10/260,161, filed on Sep. 27, 2002, entitled INDEXING TO EFFICIENTLY MANAGE VERSIONED DATA IN A DATABASE SYSTEM, by Nipun Agarwal, Eric Sedlar and Ravi Murthy;

U.S. patent application Ser. No. 10/256,524, filed on Sep. 27, 2002, entitled MECHANISMS FOR STORING CONTENT AND PROPERTIES OF HIERARCHICALLY ORGANIZED RESOURCES, by Ravi Murthy, Eric Sedlar, Nipun Agarwal, and Neema Jalali;

U.S. patent application Ser. No. 10/259,176, filed on Sep. 27, 2002, entitled MECHANISM FOR UNIFORM ACCESS CONTROL IN A DATABASE SYSTEM, by Ravi Murthy, Eric Sedlar, Nipun Agarwal, Sam Idicula, and Nicolas Montoya;

U.S. patent application Ser. No. 10/256,777, filed on Sep. 27, 2002, entitled LOADABLE UNITS FOR LAZY MANIFESTATION OF XML DOCUMENTS by Syam Pannala, Eric Sedlar, Bhushan Khaladkar, Ravi Murthy, Sivasankaran Chandrasekar, and Nipun Agarwal;

U.S. patent application Ser. No. 10/260,381, filed on Sep. 27, 2002, entitled MECHANISM TO EFFICIENTLY INDEX STRUCTURED DATA THAT PROVIDES HIERARCHICAL ACCESS IN A RELATIONAL DATABASE SYSTEM, by Neema Jalali, Eric Sedlar, Nipun Agarwal, and Ravi Murthy;

U.S. patent application Ser. No. 10/648,600, filed on the same day herewith, entitled DIRECT LOADING OF SEMISTRUCTURED DATA, by Namit Jain, Nipun Agarwal, and Ravi Murthy;

U.S. patent application Ser. No. 10/648,577, filed on the same day herewith, entitled DIRECT LOADING OF OPAQUE TYPES, by Namit Jain, Ellen Batbouta, Ravi Murthy, Nipun Agarwal, Paul Reilly, and James Stenoish; and U.S. patent application Ser. No. 10/648,749, filed on the same day herewith, entitled IN-PLACE EVOLUTION OF XML SCHEMAS, by Sam Idicula, Nipun Agarwal, Ravi Murthy, and Sivasankaran Chandrasekar.

FIELD OF THE INVENTION

The present invention relates to content management systems, and in particular, to techniques for updating XML-schema-based instance documents and XML-schema-based content management system structures, such as database structures, to conform to an updated XML schema.

BACKGROUND OF THE INVENTION

Using Extensible Markup Language (XML), information may be represented in conformity with a specified hierarchical structure. An XML schema defines such a structure. An XML schema comprises a root XML element. One or more other XML elements may be nested within the root XML element as content of the root XML element. Such nested XML elements are called child XML elements of the root XML element. Conversely, the root XML element is called the parent XML element of the child XML elements. Each child XML element may, in turn, be a parent XML element of one or more additional child XML elements nested within the parent XML element. The parent-child relationships of XML elements within an XML schema define a hierarchical structure according to which information may be stored in a hierarchically structured manner.

Each XML element may comprise one or more XML attributes. An XML attribute provides additional information about an XML element. An XML attribute typically appears in the form attribute_name='attribute_value'. An XML attribute typically is enclosed within a single XML tag instead of being between XML tags. For example, in the XML element "<person gender='female'>", "gender" is an XML attribute of the "person" XML element, and "female" is the value of the "gender" XML attribute. As used herein, statements about content values of XML elements also apply to the values of XML attributes. An XML schema specifies the type of each XML element's content value and each XML attribute's value.

Information stored in conformity with an XML schema does not need to indicate the XML tags of the XML elements in the XML schema. Specifically, as long as it is known to which XML schema such information conforms, content values that correspond to XML elements in an XML schema may be stored without the XML tags that would enclose the content values. For example, content values may be stored according to a format in which the content values are separated by delimiters such as comma characters. Reference may be made to the corresponding XML schema in order to align the content values with their corresponding XML elements in the XML schema. By storing content values without the XML tags that otherwise would enclose the content values, information may be stored more efficiently.

For another example, content management system structures, including database structures such as database tables and database views, may be generated based on an XML schema. The names and data types associated with columns in such database tables may correspond to names and data types indicated by attributes of XML elements in the XML schema. A content value that corresponds to a particular XML element in the XML schema may be stored in a database table's column that corresponds to the particular XML element.

Content values that correspond to XML elements in an XML schema may also be stored in content management systems other than database systems. For example, some file systems may store such content values according to a structure indicated by an XML schema.

Multiple different sets of content values, each based on the same XML schema, may be stored distinctly from each other. Each set is a separate "instance document." For example, an XML schema may define an XML element such as "<element name='quantity' type='integer'>". One instance document may contain a content value of "1" that corresponds to the XML element. Another instance document may contain a content value of "2" that corresponds to the same XML element. When content values are stored in database tables, content values from different instance documents may be stored in different rows of the database tables. Content values that correspond to the same XML element may be stored in the same column of a database table.

Often, even after many instance documents have been generated in conformity with a particular XML schema, it may be desirable to evolve the XML schema. For example, it may be desirable to add a new XML element to the XML schema, sometimes by inserting the new XML element between existing XML elements in the XML schema. For another example, if a particular XML element represents an enumerated data type, it may be desirable to insert a new XML element into a set of child XML elements of the particular XML element, where each child XML element represents a different enumerated value.

An XML schema may be modified manually using, for example, a text editing tool. Unfortunately, as a consequence of the modification of the XML schema, existing instance documents that formerly conformed to the XML schema might cease to conform to the XML schema. Instance documents interpreted according to the modified XML schema might be interpreted incorrectly, causing content values in the instance documents to be aligned with the wrong XML elements in the modified XML schema. Also, existing instance documents may be interpreted incorrectly if the mapping of a specific column to a specific XML element has changed.

Additionally, content management system structures, including database structures such as database tables and database views, whose structures were based on the XML schema prior to the modification of the XML schema, might also cease to conform to the XML schema. As a result, it might be impossible to store correctly, in such content management system structures, content values in instance documents generated in conformity with the modified XML schema. For example, a database table might lack a column that corresponds to a new XML element that was inserted into the XML schema. Structures indicated by content management systems other than database systems similarly might cease to conform to an XML schema after the XML schema is modified.

There is no established approach for ensuring that XML-schema-based instance documents and content management system structures, such as database structures, will continue to conform to the XML schema upon which they are based after the XML schema has been modified. A technique is needed for evolving an XML schema while ensuring that XML-schema-based instance documents and content management system structures, such as database structures, will continue to conform to the XML schema even after the XML schema has been evolved.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
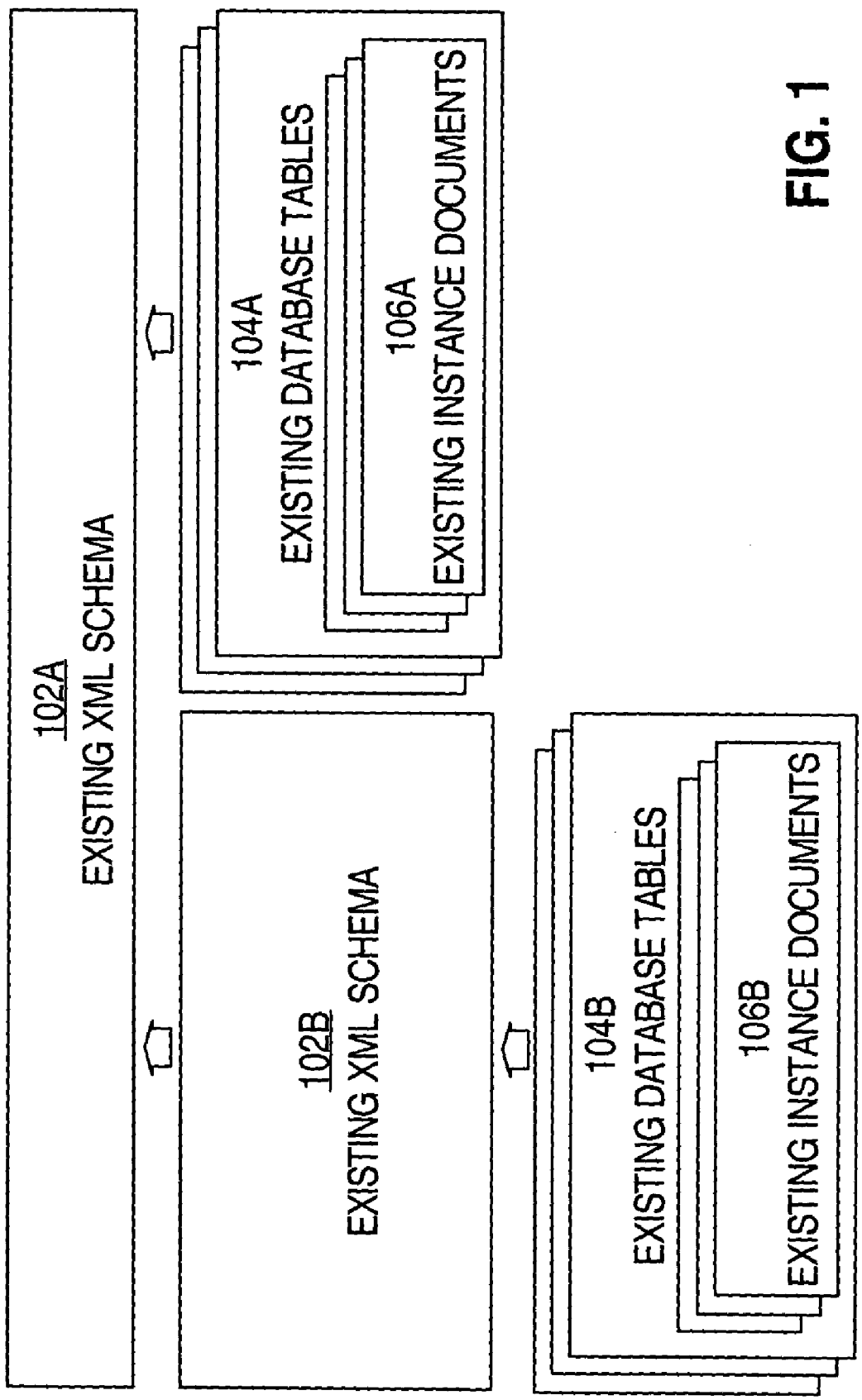
FIG. 1 is a block diagram that illustrates an example of the associations between instance documents and XML schemas, and between a dependant XML schema and a base XML schema.

A method and system are provided for updating XML-schema-based data structures and data contained therein to conform to an updated XML schema. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

FUNCTIONAL OVERVIEW

It is desirable that instance documents and content management system structures that conform to an XML schema evolve with the XML schema so that the instance documents and content management system structures continue conform to the XML schema after the XML schema has been evolved. As used herein, a content management system is any repository that provides for the storage of information in conformity with a structure indicated by an XML schema. One such content management system is a database system, which may provide structures such as tables and views. According to one embodiment of the present invention, such continued conformity is achieved with a Procedural Language/Structured Query Language (PL/SQL) procedure that executes in a computer system.

The procedure receives one or more identities of existing XML schemas. The procedure also receives one or more identities of evolved XML schemas that correspond to the existing XML schemas. The evolved XML schemas are versions of the corresponding existing XML schemas that incorporate one or more modifications. A user may make such modifications to existing XML schemas to produce corresponding evolved XML schemas. Uniform Resource Locators (URLs) associated with the XML schemas may identify the XML schemas.

The procedure additionally receives one or more references to sets of transformations that correspond to the one or more existing XML schemas. Each set of transformations indicates changes that should be made to instance documents that are based on a corresponding existing XML schema so that the instance documents will conform to the corresponding evolved XML schema. A user may express such sets of transformations in Extensible Stylesheet Language (XSL). Thus, each set of transformations may be a separate XSL document.

For each of the one or more existing XML schemas, the procedure identifies structures that store existing instance documents that depend on the existing XML schema. The procedure reads the existing instance documents from such structures. For each such existing instance document, the procedure generates an XML-schema-independent instance document that indicates the structure of the existing XML schema, the content values indicated by the existing instance document, and the correlation between the structure and the content values.

For example, each content value in an existing instance document corresponds to an XML element in the existing XML schema. Thus, each content value has a corresponding XML element. The procedure may read content values from existing database tables that store an existing instance document. Based on the content values and the hierarchical structure indicated by the existing XML schema on which the existing instance document is based, the procedure may generate a text document in which the content values are enclosed by the XML tags of the content values' corresponding XML elements, and in which each XML element is positioned according to the hierarchical structure.

From such a text document, the content values may be interpreted correctly even without the existing XML schema. Thus, by generating such a text document, the procedure changes an instance document from an XML-schema-dependent form into an XML-schema-independent form.

With the instance documents in an XML-schema-independent form, a set of transformations can be applied to the instance documents to evolve the instance documents to conform to the corresponding evolved XML schema. Based on the XML-schema-independent instance documents and a set of one or more transformations that corresponds to the evolved XML schema, the procedure generates evolved instance documents by applying the corresponding set of transformations to the XML-schema-independent instance documents.

Assuming that the set of transformations was correctly specified, the evolved instance documents indicate the structure of the corresponding evolved XML schema, the content values indicated by the instance documents, and the correlation between the structure and the content values. Some content values that were associated with particular XML elements in the structure indicated by the existing XML schema may be associated with corresponding XML elements in the structure indicated by the evolved XML schema.

When an existing XML schema is deleted from a content management system with which the existing XML schema was registered in order to allow a corresponding evolved XML schema to be registered instead, structures that are based on the existing XML schema may become unavailable. Therefore, according to one embodiment, for each existing XML schema, the procedure additionally identifies one or more database structures, such as database tables and views, which are based on the existing XML schema. Such database structures might store or represent the content values of the existing instance documents.

For each such database structure, the procedure generates one or more Data Definition Language (DDL) statements that, when executed by a database server, will cause the database server to create the database structure in conformity with a specified XML schema. The DDL statements may indicate the name and type of the database structure, the name of the XML schema upon which the database structure is based, and the name of the XML element in the XML schema to which the database structure corresponds.

After the DDL statements have been generated, the procedure instructs a content management system, such as a database system, with which the one or more existing XML schemas are registered, to delete the existing XML schemas. The procedure instructs the content management system to drop any existing content management system structures that are based on the existing XML schemas. Such content management system structures may include existing database tables and views.

The procedure instructs the content management system to register the corresponding evolved XML schemas. If the content management system is a database system, then the procedure instructs a database server to execute the DDL statements, thereby creating evolved database structures that conform to the corresponding evolved XML schemas. Columns in the evolved database structures correspond to the XML elements in the corresponding evolved XML schemas. The procedure populates the columns of the evolved database structures with content values of corresponding XML elements indicated in the evolved instance documents.

Although the techniques described herein specifically refer in some cases to database systems and database structures, the techniques described herein may be adapted easily to apply to content management systems and content management system structures that are not database systems and database structures. For example, statements similar to DDL statements may be generated to create content management system structures other than database structures. Techniques described herein should not be construed as being limited to database systems and database structures.

Thus, techniques described herein evolve one or more XML schemas while ensuring that XML-schema-based instance documents and content management system structures continue to conform to the XML schemas even after the XML schemas have been evolved. The techniques performed by the procedure provide great flexibility in the types of changes that may be made to an XML schema without sacrificing the continued conformity of instance documents and content management system structures that are based on the XML schema.

For example, based on techniques described herein, changes to an XML schema that require the XML schema's structure to be reorganized, such as through the splitting of one XML element into two or more separate XML elements, may be made while preserving the XML schema conformity of instance documents and content management system structures. Thus, unlike approaches that require all changes to an XML schema to be expressed according to a specified notation, techniques described herein are flexible enough to accommodate evolutions, such as structural reorganizations, that would be difficult or impossible to express according to a specified notation.

DEPENDANT XML SCHEMAS

As described above, in order to place instance documents in a condition in which transformations may be applied, the instance documents are changed from an XML-schema-dependent form into an XML-schema-independent form. In addition to instance documents, one or more other dependant XML schemas may depend on a particular base XML schema. For sake of efficiency, such dependant XML schemas might not indicate the structure of the particular base XML schema. One or more other instance documents may be based on a structure indicated by such a dependant XML schema.

In order to facilitate the changing of such instance documents into a form independent of the dependant XML schema, the dependant XML schema first is changed into a form independent of the base XML schema. Based on the XML elements of the dependant XML schema and the hierarchical structure indicated by the base XML schema, the procedure described above may generate a text document in which the XML elements of the dependant XML schema are enclosed by the corresponding XML tags in the base XML schema, and in which each XML element of the dependant XML schema is positioned according to the hierarchical structure of the base XML schema.

FIG. 1 is a block diagram that illustrates an example of the associations between instance documents and XML schemas, and between a dependant XML schema and a base XML schema. Content values indicated by existing instance documents 106B are stored collectively in existing database tables 104B according to the structure indicated by existing XML schema 102B. Thus, existing instance documents 106B and existing database tables 104B conform to the structure indicated by existing XML schema 102B. Existing instance documents 106B and existing database tables 104B may be said to be dependent upon existing XML schema 102B.

Existing XML schema 102B, in turn, conforms to the structure indicated by existing XML schema 102A. Content values indicated by existing instance documents 106A are stored collectively in existing database tables 104A according to the structure indicated by existing XML schema 102A. Thus, existing instance documents 106A, existing database tables 104A, and existing XML schema 102B may be said to be dependent upon existing XML schema 102A.

Existing XML schema 102B is an example of a dependant XML schema, and existing XML schema 102A is an example of a base XML schema, as described above. In order to facilitate the changing of existing instance documents 106B into a form independent of existing XML schema 102B, existing XML schema 102B first is changed into a form independent of existing XML schema 102A. As a result, XML-schema-independent forms of existing instance documents 106B will indicate the complete structure indicated by existing XML schemas 102A and 102B.

ROLES OF XML SCHEMAS, INSTANCE DOCUMENTS, AND XSL DOCUMENTS IN GENERATING EVOLVED INSTANCE DOCUMENTS

Figure 2:
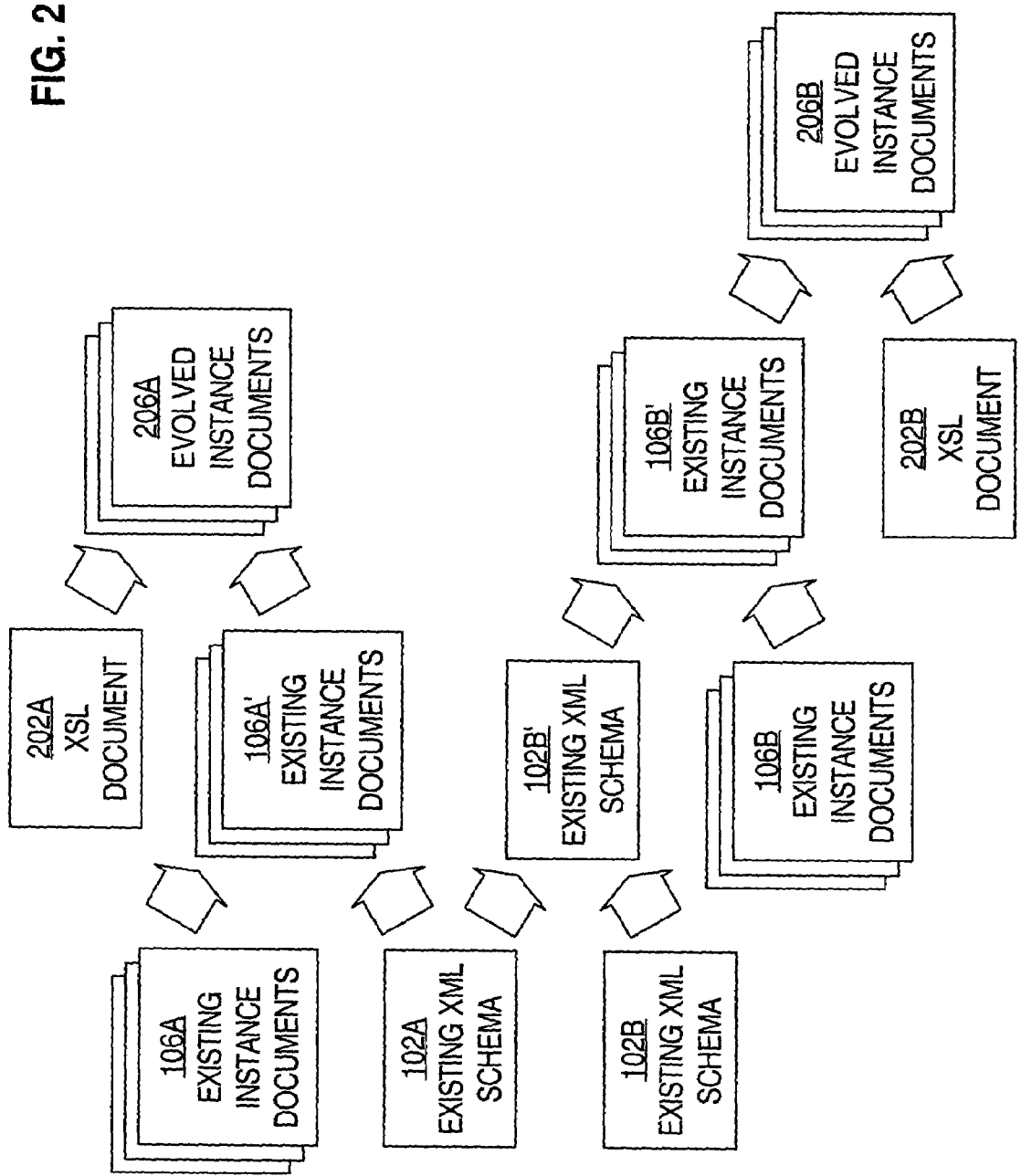
FIG. 2 is a block diagram that illustrates an example of how existing XML schemas, existing instance documents, and XSL documents interact in the generation of evolved instance documents.

Existing XML schemas and XSL documents each have a role in generating evolved instance documents from existing instance documents. FIG. 2 is a block diagram that illustrates an example of how existing XML schemas, existing instance documents, and XSL documents interact in the generation of evolved instance documents.

In the example illustrated, existing instance documents 106A and existing instance documents 106B are in XML-schema-dependent form. Existing instance documents 106A depend on existing XML schema 102A to indicate the XML elements to which the values in existing instance documents 106A correspond. Similarly, existing instance documents 106B depend on existing XML schema 102B to indicate the XML elements to which the values in existing instance documents 106B correspond. In turn, existing XML schema 102B depends on existing XML schema 102A.

For example, each of existing instance documents 106A may indicate content values read from different rows of existing database tables 104A. One existing instance document may indicate content values read from one row in one or more database tables, while another existing instance document may indicate content values read from another row in the same database tables.

Existing instance documents 106A' are derived based on existing XML schema 102A and existing instance documents 106A. Unlike existing instance documents 106A, existing instance documents 106A' are XML-schema-independent in form. Existing instance documents 106A' indicate the structure and XML elements indicated by existing XML schema 102A. For each of existing instance documents 106A, a corresponding one of existing instance documents 106A' is generated.

Evolved instance documents 206A are derived based on existing instance documents 106A' and XSL document 202A. Unlike existing instance documents 106A', evolved instance documents 206A conform to an evolved XML schema instead of existing XML schema 102A. XSL document 202A indicates one or more changes that should be made to each of existing instance documents 106A' in order to generate corresponding ones of evolved instance documents 206A.

For example, XSL document 202A may indicate that an "address" XML element in each of existing instance documents 106A' should be split, according to a specified set of instructions, into new and separate "street," "city," and "state" XML elements in corresponding ones of evolved instance documents 206A. For another example, XSL document 202A may indicate that an XML element having a specified name in each of existing instance documents 106A' should be renamed to a different specified name in corresponding ones of evolved instance documents 206A. Assuming that the transformations in XSL document 202A are specified correctly, each of evolved instance documents 206A conforms to an evolved XML schema as a result.

Existing instance documents that are based on dependant XML schemas are evolved after the dependant XML schemas themselves are evolved. Existing XML schema 102B' is derived based on existing XML schema 102A and existing XML schema 102B. Unlike existing XML schema 102B, existing XML schema 102B' can be interpreted independently and correctly without XML schema 102A. Existing XML schema 102B' indicates the structure and XML elements indicated by existing XML schema 102A, the structure and XML elements indicated by existing XML schema 102B, and the correspondence between those structures and XML elements.

For example, existing XML schema 102B may indicate that an "address" XML element, whose internal structure is defined in existing XML schema 102A but not in existing XML schema 102B, is a child XML element of a "purchase order" XML element that is defined in existing XML schema 102B but not in existing XML schema 102A. Existing XML schema 102B' would indicate a structure in which the "address" XML element is indicated (i.e., by enclosure within the "purchase order" XML tags) to be the child XML element of the "purchase order" XML element. Existing XML schema 102B' would also indicate the internal structure of the "address" XML elements, such as all of the child XML elements of the "address" XML element, as indicated by the structure of existing XML schema 102B.

Existing instance documents 106B' are derived based on existing XML schema 102B' and existing instance documents 106B. Unlike existing instance documents 106B, existing instance documents 106B' are XML-schema-independent in form. Existing instance documents 106B' indicate the structure and XML elements indicated by existing XML schema 102B'. For each of existing instance documents 106B, a corresponding one of existing instance documents 106B' is generated.

Evolved instance documents 206B are derived based on existing instance documents 106B' and XSL document 202B. Unlike existing instance documents 106B', evolved instance documents 206B conform to an evolved XML schema instead of existing XML schema 102B'. XSL document 202B indicates one or more changes that should be made to each of existing instance documents 106B' in order to generate corresponding ones of evolved instance documents 206B. Assuming that the transformations in XSL document 202B are specified correctly, each of evolved instance documents 206B conforms to an evolved XML schema as a result.

Although the techniques described herein specifically refer in some cases to transformations being expressed in XSL, the techniques described herein are equally applicable when such transformations are expressed in a notation or language other than XSL. XSL provides a convenient mechanism for expressing transformations to XML documents. However, techniques described herein should not be construed as being limited to those that express transformations in XSL.

ROLES OF EXISTING DATABASE TABLES, EVOLVED XML SCHEMAS, AND EVOLVED INSTANCE DOCUMENTS IN GENERATING AND POPULATING EVOLVED DATABASE TABLES

It is desirable that content values read from columns of one or more existing database tables should be preserved in corresponding columns of corresponding evolved database tables, where such corresponding columns and database tables exist. For example, if content values are read from a "street" column of an existing "address" table, and if a corresponding evolved "address" table also contains the "street" column, then the "street" column of the evolved "address" table should be populated with the content values read from the "street" column of the existing address table, even if the evolved "address" table has some different columns than the existing "address" table. Therefore, according to one embodiment, for each database structure that is based on the existing XML schema, one or more DDL statements are generated that, when executed by a database server, will cause the database server to create the same database structure, except in conformity with an evolved XML schema rather than the existing XML schema.

Figure 3:
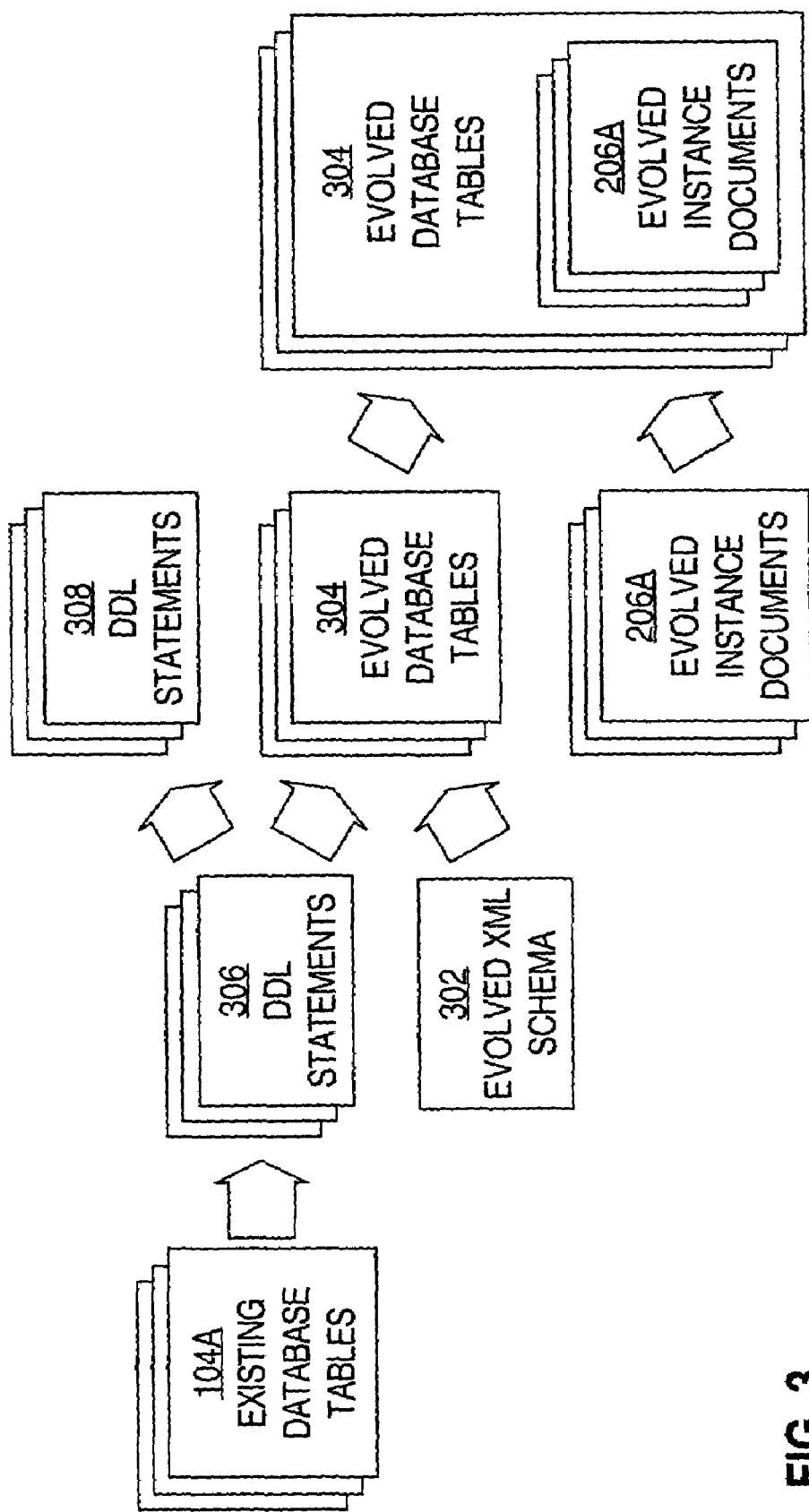
FIG. 3 is a block diagram that illustrates an example of how existing database tables, evolved XML schemas, and evolved instance documents interact in the generation and population of evolved database tables.

FIG. 3 is a block diagram that illustrates an example of how existing database tables, evolved XML schemas, and evolved instance documents interact in the generation and population of evolved database tables. DDL statements 306 are derived based on the structures (e.g., numbers, names, and types of columns) of existing database tables 104A. DDL statements 306 may indicate the name and type of the database structures, the names of the XML schemas upon which the database structures are based, and the names of the XML elements in the XML schema to which the database structures correspond. For example, a generated DDL statement might read:
CREATE TABLE PO_TAB OF XMLTYPE XMLSCHEMA "PO.XSD" ELEMENT "PURCHASE ORDER".

After existing XML schema 102A has been deleted and existing database tables 104A have been dropped from the database system, and after evolved XML schema 302 has been registered with the database system, DDL statements 306 may be executed, thereby creating evolved database structures that conform to the currently registered evolved XML schema 302. Because evolved database tables 304 are generated based on evolved XML schema 302, columns of evolved database tables 304 correspond to XML elements of evolved XML schema 302 and, by extension, XML elements of evolved instance documents 206A.

Columns of evolved database structures 304 may be populated with content values of corresponding XML elements indicated in evolved instance documents 206A. As described above with reference to FIG. 2, such content values were originally read from corresponding columns of existing database tables 104A. As a result, the content values read from columns of existing database tables 104A are preserved in corresponding columns of evolved database tables 304, where such corresponding columns exist.

ROLLBACK STATEMENTS

DDL statements 306 may be called "evolve" statements because, when executed, the DDL statements cause a database server to evolve existing database tables 104A into evolved database tables 304. In order to make the evolution an atomic transaction, DDL statements 308 are also generated. DDL statements 308 are generated such that, if executed by a database server, DDL statements 308 will cause the database server to undo, or "roll back" all of the effects of DDL statements 306 that have been executed when the error occurs. Therefore, DDL statements 308 may be called "rollback statements."

If, during execution of DDL statements 306, an error occurs, then a database server executes those of DDL statements 308 that will reverse the effects of those of DDL statements 306 that the database server has executed. Therefore, unless the entire evolution completes successfully, no part of the evolution is made permanent.

Changes to instance documents may also be reversed when an error occurs during evolution. For example, changes specified in XSL document 202A and made to existing instance documents 106A' in order to generate evolved instance documents 206A may be undone if an error occurs before the entire evolution transaction is complete.

EXAMPLE TECHNIQUE FOR UPDATING XML-SCHEMA-BASED DATA TO CONFORM TO AN UPDATED XML SCHEMA

Figure 4A:
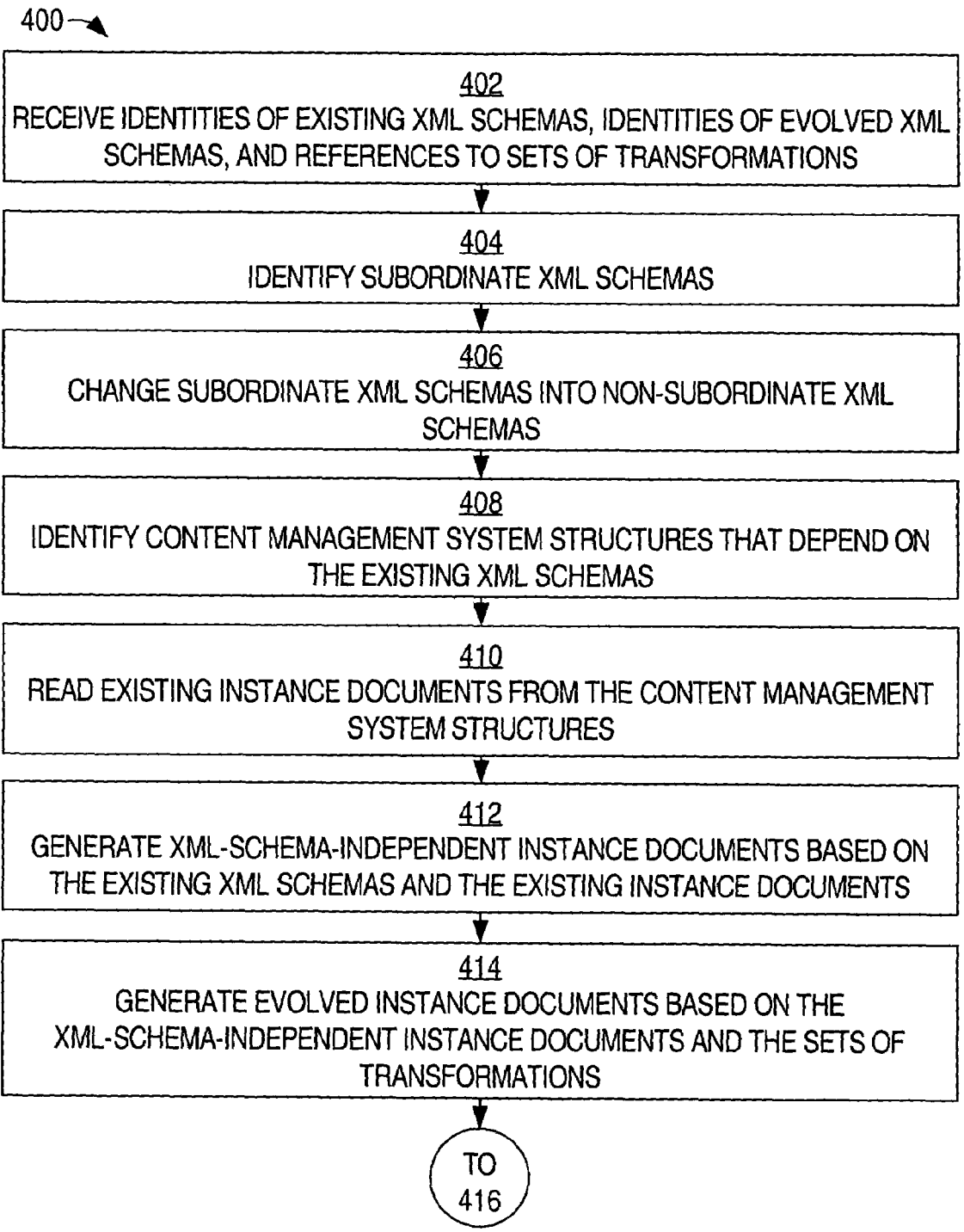
FIGS. 4A and 4B are flow diagrams that illustrate a technique, according to an embodiment of the present invention, for updating XML-schema-based data to conform to an updated XML schema.
Figure 4B:
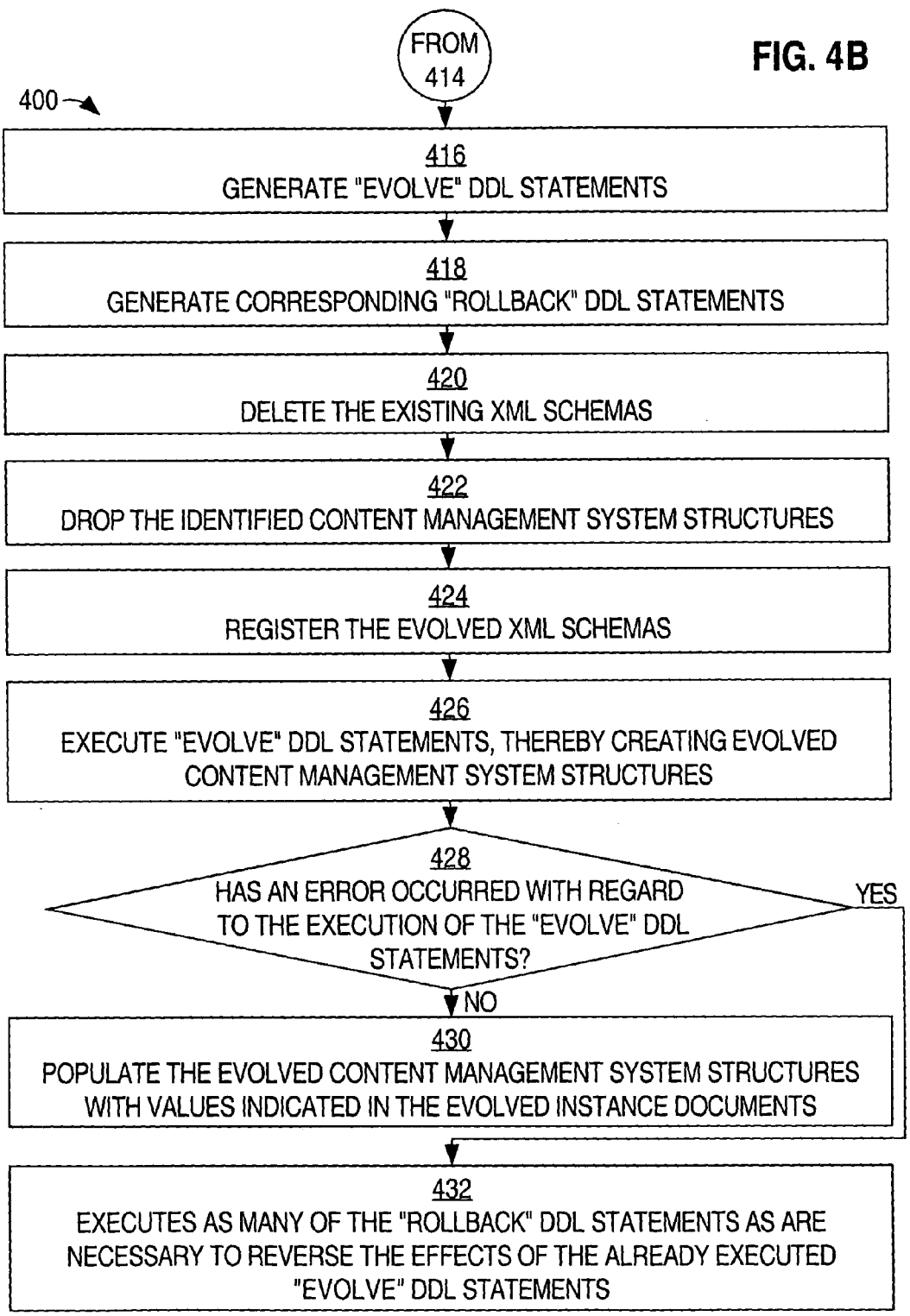

FIGS. 4A and 4B are flow diagrams that illustrate a technique 400, according to an embodiment of the present invention, for updating XML-schema-based data to conform to an updated XML schema. Technique 400 may be performed, for example, by a PL/SQL procedure specified in the code of a database server program.

In block 402, the following are received: one or more identities of existing XML schemas, one or more identities of evolved XML schemas that correspond to the existing XML schemas, and one or more references to sets of transformations that correspond to the existing XML schemas. The evolved XML schemas are versions of the corresponding existing XML schemas that incorporate one or more modifications.

Each set of transformations corresponds to a different existing XML schema. A set of transformations indicates changes that should be made to the corresponding existing XML schema's instance documents. Applying the transformations to the existing XML schema's instance documents causes the instance documents to conform to the existing XML schema's corresponding evolved XML schema.

In block 404, for each of the one or more existing XML schemas, dependant XML schemas that depend on a base XML schema are identified. In block 406, each such dependant XML schema is changed, based on the dependant XML schema and the base XML schema, as described above, into a non-dependant XML schema that can be interpreted independently and correctly without the base XML schema.

In block 408, for each of the one or more existing XML schemas, content management system structures that depend on the existing XML schema are identified. Such content management system structures may be, for example, files or database tables.

In block 410, existing instance documents that depend on the existing XML schema are read from the identified content management system structures. In block 412, for each such existing instance document, a separate XML-schema-independent instance document is generated based on the existing instance document and the existing XML schema, as described above.

In block 414, for each of the XML-schema-independent instance documents, a separate evolved instance document is generated. The evolved instance document is based on the XML-schema-independent instance document and the set of one or more transformations that corresponds to the existing XML schema upon which the existing instance document is based. The evolved instance document is generated by applying the set of transformations to the XML-schema-independent instance document.

In block 416, for each content management system structure identified in block 408, one or more "evolve" DDL statements are generated, as described above. The "evolve" DDL statements, when executed, cause the content management system structure to be generated in conformity with a specified XML schema. Each "evolve" DDL statement corresponds to the content management structure that the "evolve" DDL statement is designed to generate when executed. In block 418, for each of the one or more "evolve" DDL statements generated in block 416, a corresponding "rollback" DDL statement is generated, as described above.

In block 420, the existing XML schemas identified in block 402 are deleted from the content management system with which the existing XML schemas were registered. In block 422, the content management system structures identified in block 408 are dropped from the content management system.

In block 424, the evolved XML schemas identified in block 402 are registered with the content management system. In block 426, the "evolve" DDL statements generated in block 416 are executed, thereby creating evolved content management system structures that conform to the evolved XML schemas, which are currently registered with the content management system.

For example, if the currently registered XML schema indicates a new XML element that did not exist in the formerly registered XML schema, then a database table generated as a result of executing a corresponding DDL statement includes a column that corresponds to the new XML element. Similarly, if the currently registered XML schema does not indicate an XML element that existed in the formerly registered XML schema, then a database table generated as a result of executing a corresponding DDL statement lacks a column that corresponds to the XML element.

While the "evolve" DDL statements are executed, it is determined, in block 428, whether an error has occurred with regard to the execution of the "evolve" DDL statements. If the "evolve" DDL statements execute entirely without an error, then control passes to block 430. Otherwise, control passes to block 432 as soon as an error occurs.

In block 430, the columns of the evolved content management system structures are populated, as described above, with content values of corresponding XML elements indicated in the evolved instance documents that were generated in block 414.

Alternatively, if an error is detected in block 426, then, in block 432, as many of the "rollback" DDL statements are executed as are necessary to reverse the effects of the already executed "evolve" DDL statements. Changes made to the instance documents in block 414, which are indicated by the set of transformations applied to the instance documents, may also be undone by applying the inverse of the indicated changes. As a result, all of the content managements system structures involved in the evolution are rolled back to their pre-evolutionary state. Thus, the evolution is guaranteed to be an atomic operation.

HARDWARE OVERVIEW

Figure 5:
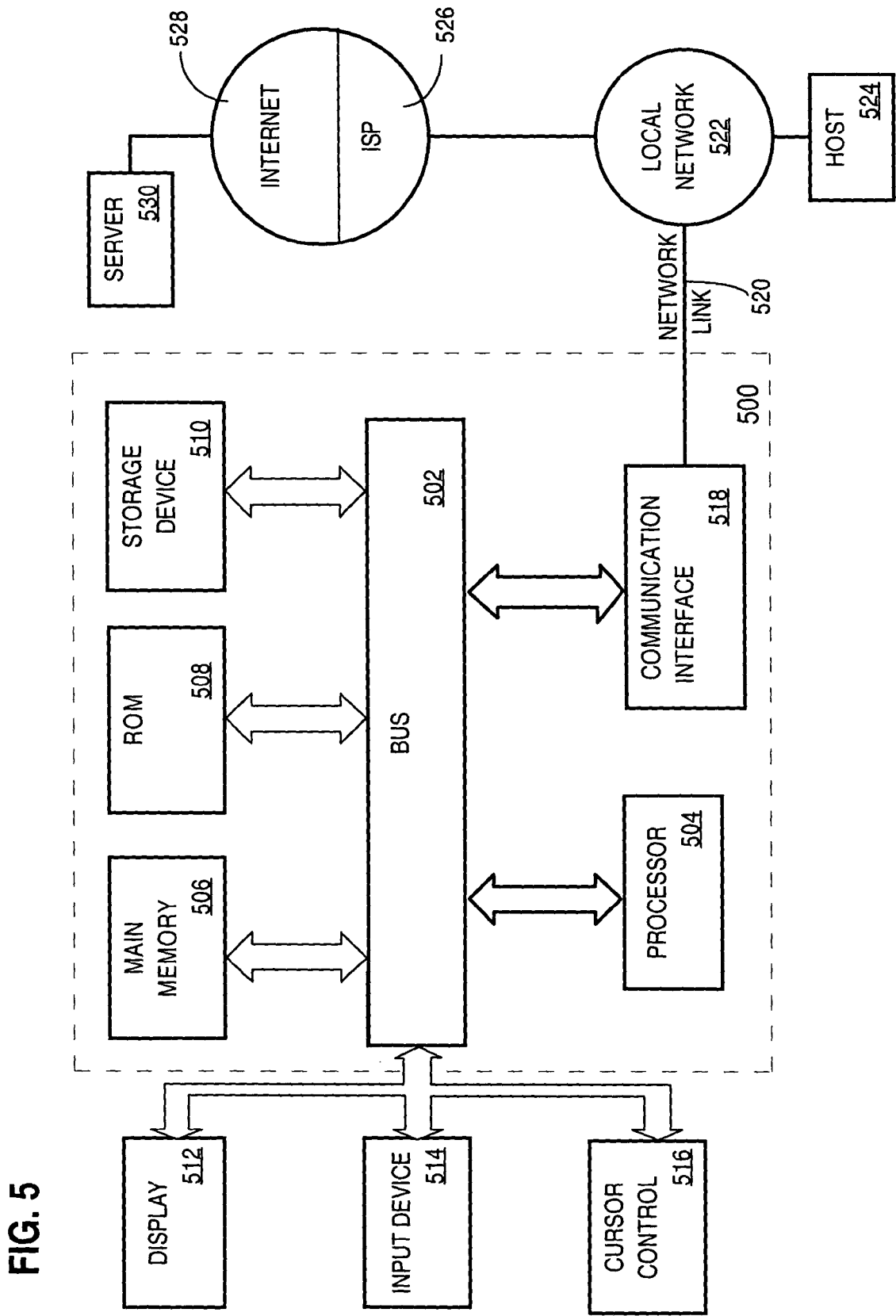
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    a procedure receiving an identity of an existing XML schema;
    the procedure receiving an identity of an evolved XML schema that is a version of the existing XML schema that incorporates one or more modifications;
    the procedure receiving a reference to a transformation set that indicates changes that, when made to instance documents that conform to the existing XML schema, will cause the instance documents to conform to the evolved XML schema;
    the procedure reading data for different existing XML-schema-dependent instance documents, wherein the existing XML-schema-dependent instance documents do not contain tags of the existing XML schema;
    based on said data, the procedure generating, for each particular existing XML-schema-dependent instance document of the existing XML-schema-dependent instance documents, a corresponding XML-schema-independent instance document that contains both (a) the tags of the existing XML schema and (b) particular data from said particular existing XML-schema-dependent document, thereby generating XML-schema-independent instance documents that contain data from the existing XML-schema-independent instance documents and conform to the existing XML schema;
    for each particular XML-schema-independent instance document of the XML-schema-independent instance documents, the procedure applying, to the particular XML-schema-independent instance document, one or more transformations in the transformation set, thereby producing evolved XML-schema-independent instance documents that conform to the evolved XML schema instead of the existing XML schema;
    the procedure instructing the database server to execute one or more DDL statements to create evolved database structures that are based on the evolved XML schema; and
    the procedure populating one or more columns of the evolved database structures with content values of column-corresponding XML elements that are contained in the evolved XML-schema-independent instance documents.

2. A tangible computer-readable storage medium carrying one or more sequences of instructions which, when executed by one or more processors, causes the one or more processors to perform the method recited in claim 1.

3. A method comprising:

receiving an identity of an existing XML schema;

receiving an identity of an evolved XML schema that is a version of the existing XML schema that incorporates one or more modifications;

receiving a reference to a transformation set that indicates changes that, when made to instance documents that conform to the existing XML schema, will cause the instance documents to conform to the evolved XML schema;

reading data for different existing XML-schema-dependent instance documents, wherein the existing XML-schema-dependent instance documents do not contain tags of the existing XML schema;

based on said data, generating, for each particular existing XML-schema-dependent instance document of the existing XML-schema-dependent instance documents, a corresponding XML-schema-independent instance document that contains both (a) the tags of the existing XML schema and (b) particular data from said particular existing XML-schema-dependent document, thereby generating XML-schema-independent instance documents that contain data from the existing XML-schema-independent instance documents and conform to the existing XML schema;

for each particular XML-schema-independent instance document of the XML-schema-independent instance documents, applying, to the particular XML-schema-independent instance document, one or more transformations in the transformation set, thereby producing evolved XML-schema-independent instance documents that conform to the evolved XML schema instead of the existing XML schema;

instructing the database server to execute one or more DDL statements to create evolved database structures that are based on the evolved XML schema; and populating one or more columns of the evolved database structures with content values of column-corresponding XML elements that are contained in the evolved XML-schema-independent instance documents.

4. A tangible computer-readable storage medium carrying one or more sequences of instructions which, when executed by one or more processors, causes the one or more processors to perform the method recited in claim 3.

* * * * *

UNITED STATES PATENT AND TRADEMARK OFFICE
CERTIFICATE OF CORRECTION

PATENT NO. : 7,395,271 B2  Page 1 of 1
APPLICATION NO. : 10/648497
DATED : July 1, 2008
INVENTOR(S) : Idicula et al.

It is certified that error appears in the above-identified patent and that said Letters Patent is hereby corrected as shown below:

Title page 2, in column 2, under "Other Publications", line 1, delete "Obejcts" and insert -- Objects --, therefor.

Title page 2, in column 2, under "Other Publications", line 17, delete "Internatioanl" and insert -- International --, therefor.

Title page 2, in column 2, under "Other Publications", line 20, delete "Ortacle" and insert -- Oracle --, therefor.

In column 13, line 23, delete "computer readable" and insert -- computer-readable --, therefor.

Signed and Sealed this

Tenth Day of November, 2009

David J. Kappos
*Director of the United States Patent and Trademark Office*